US010555321B2

United States Patent
Andou et al.

(10) Patent No.: US 10,555,321 B2
(45) Date of Patent: Feb. 4, 2020

(54) MOBILE TERMINAL, BASE STATION, COMMUNICATION STATE NOTIFICATION METHOD, AND SCHEDULING METHOD

(71) Applicant: NTT DOCOMO, INC., Tokyo (JP)

(72) Inventors: Kei Andou, Tokyo (JP); Hidetoshi Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 4 days.

(21) Appl. No.: 15/511,058

(22) PCT Filed: Sep. 14, 2015

(86) PCT No.: PCT/JP2015/076044
§ 371 (c)(1),
(2) Date: Mar. 14, 2017

(87) PCT Pub. No.: WO2016/047488
PCT Pub. Date: Mar. 31, 2016

(65) Prior Publication Data
US 2018/0206243 A1  Jul. 19, 2018

(30) Foreign Application Priority Data

Sep. 26, 2014  (JP) ................. 2014-197416

(51) Int. Cl.
*H04W 72/08* (2009.01)
*H04W 72/12* (2009.01)
(Continued)

(52) U.S. Cl.
CPC ......... *H04W 72/085* (2013.01); *H04W 24/10* (2013.01); *H04W 68/005* (2013.01);
(Continued)

(58) Field of Classification Search
CPC . H04W 72/085; H04W 24/10; H04W 68/005; H04W 88/06
(Continued)

(56) References Cited

U.S. PATENT DOCUMENTS

| 8,442,564 B2 | 5/2013 | Love et al. |
| 2011/0034177 A1* | 2/2011 | Oh ....................... H04J 11/0086 455/450 |

(Continued)

FOREIGN PATENT DOCUMENTS

| EP | 2604085 A2 | 6/2013 |
| JP | 2014-506418 A | 3/2014 |
| WO | 2014/044436 A1 | 3/2014 |

OTHER PUBLICATIONS

International Search Report issued in PCT/JP2015/076044, dated Dec. 8, 2015 (7 pages).
(Continued)

*Primary Examiner* — Ayodeji O Ayotunde
(74) *Attorney, Agent, or Firm* — Osha Liang LLP

(57) ABSTRACT

A mobile terminal capable of communication in a cellular system and another radio system with a different frequency band includes a simultaneous communication determination unit configured to determine whether the mobile terminal simultaneously communicates in the cellular system and the other radio system; and a notification unit configured to notify a base station that the mobile terminal is in a simultaneous communication state, when the mobile terminal simultaneously communicates in the cellular system and the other radio system.

6 Claims, 6 Drawing Sheets

(51) Int. Cl.
*H04W 24/10* (2009.01)
*H04W 68/00* (2009.01)
*H04W 72/04* (2009.01)
*H04W 88/06* (2009.01)

(52) U.S. Cl.
CPC ......... *H04W 72/044* (2013.01); *H04W 72/12* (2013.01); *H04W 88/06* (2013.01)

(58) Field of Classification Search
USPC ..................................... 455/552.1
See application file for complete search history.

(56) References Cited

U.S. PATENT DOCUMENTS

| 2012/0207040 A1* | 8/2012 | Comsa | H04W 72/1215 370/252 |
|---|---|---|---|
| 2014/0153433 A1* | 6/2014 | Zhou | H04W 72/1231 370/252 |
| 2015/0230286 A1* | 8/2015 | Feuersaenger | H04W 72/1215 370/252 |
| 2016/0037520 A1* | 2/2016 | Wang | H04W 72/0453 370/329 |

OTHER PUBLICATIONS

Written Opinion of the International Searching Authority issued in PCT/JP2015/076044, dated Dec. 8, 2015 (3 pages).
3GPP TS 36.101 V12.4.0; "3rd Generation Partnership Project; Technical Specification Group Radio Access Network; Evolved Universal Terrestrial Radio Access (E-UTRA); User Equipment (UE) radio transmission and reception (Release12)"; Jun. 2014 (531 pages).
Extended European Search Report issued in corresponding European Patent Applicaton No. 15843970.3, dated Sep. 15, 2017 (8 pages).
Office Action issued in the counterpart European Patent Application No. 15843970.3, dated Jan. 3, 2019 (5 pages).
Notification of Reasons for Refusal issued in counterpart Japanese Patent Application: 2016-550113, dated Apr. 9, 2019 (5 Pages).
Office Action issued in counterpart Japanese Patent Application No. 2016-550113, dated Jun. 18, 2019 (3 pages).
Office Action issued in European Application No. 15843970.3; dated Nov. 6, 2019 (6 pages).

* cited by examiner

| UE UL CARRIERS | fx_low | fx_high | fy_low | fy_high |
|---|---|---|---|---|
| 2ND ORDER HARMONIC | 2*fx_low | 2*fx_high | 2*fy_low | 2*fy_high |
| 3RD ORDER HARMONIC | 3*fx_low | 3*fx_high | 3*fy_low | 3*fy_high |
| TWO-TONE 2ND ORDER IMD | |fx_low − fy_high| | |fx_low − fy_high| | |fx_high − fy_low| | |fx_high − fy_low| |
| TWO-TONE 3RD ORDER IMD | |2*fx_low − 1*fy_high| | |2*fx_high − 1*fy_high| | |2*fy_low − 1*fx_high| | |2*fy_high − 1*fx_low| |
| TWO-TONE 4TH ORDER IMD | |3*fx_low − 1*fy_high| | |3*fx_high − 1*fy_high| | |3*fy_low − 1*fx_high| | |3*fy_high − 1*fx_low| |
| TWO-TONE 4TH ORDER IMD | |2*fx_low − 2*fy_high| | |2*fx_high − 2*fy_high| | |2*fy_low − 2*fx_high| | |2*fy_high − 2*fx_low| |
| TWO-TONE 5TH ORDER IMD | |4*fx_low − 1*fy_high| | |4*fx_high − 1*fy_high| | |4*fy_low − 1*fx_high| | |4*fy_high − 1*fx_low| |
| TWO-TONE 5th ORDER IMD | |3*fx_low − 2*fy_high| | |3*fx_high − 2*fy_high| | |3*fy_low − 2*fx_high| | |3*fy_high − 2*fx_low| |

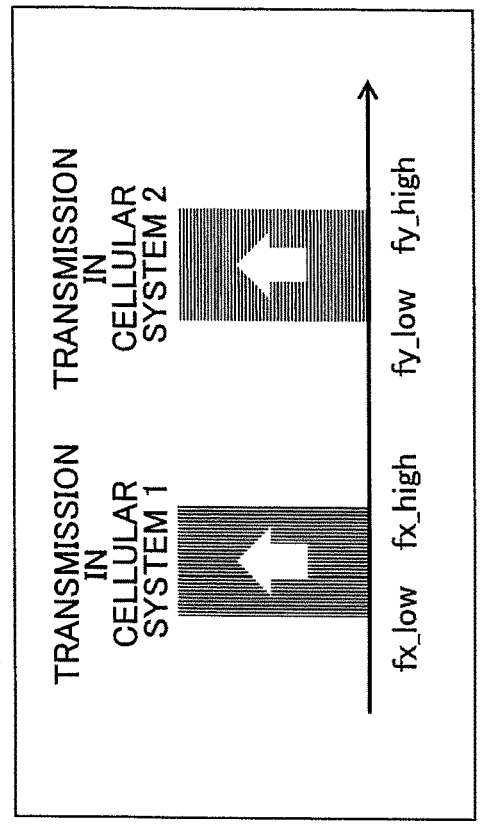

FIG.8

MOBILE TERMINAL, BASE STATION, COMMUNICATION STATE NOTIFICATION METHOD, AND SCHEDULING METHOD

TECHNICAL FIELD

The present invention relates to a mobile terminal, a base station, a communication state notification method, and a scheduling method.

BACKGROUND ART

In Third Generation Partnership Project (3GPP), frequency bands available for uplink transmission from a mobile terminal (also referred to as a "UE") to a base station (also referred to as an "eNode B") and downlink transmission from the base station to the mobile terminal are defined. In addition, carrier aggregation (CA) is under discussion to enable simultaneous use of a plurality of frequency bands (see Non-Patent Document 1).

It is known that unnecessary radiation such as an intermodulation distortion (IMD) or a harmonic distortion occurs in a mobile terminal upon uplink transmission from the mobile terminal to a base station in a cellular system.

An IMD is an interference wave which occurs, when signals with two or more different frequencies coexist, on frequencies defined by the combination of the sums or the differences of these two or more different frequencies. When a plurality of frequency bands are simultaneously used according to carrier aggregation, an IMD occurs as a result of the combination of signals on these frequency bands.

A harmonic distortion is an interference wave which occurs on frequencies defined by multiples of a signal frequency. Not only when a plurality of frequency bands are simultaneously used according to carrier aggregation, but also when a single frequency band is used, a harmonic distortion occurs.

PRIOR ART DOCUMENT

Non-Patent Document

[Non-Patent Document 1] 3GPP TS 36.101 V12.4.0 (2014-06)

DISCLOSURE OF INVENTION

Problem(s) to be Solved by the Invention

When a mobile terminal can communicate in a cellular system as well as in another radio system (for example, a Global Navigation Satellite System (GNSS) or a wireless local area network (LAN)), it can be expected that the mobile terminal will simultaneously communicate both in the cellular system and the other radio system. For example, when a navigation application is used, a mobile terminal performs location measurement by using a Global Positioning Satellite (GPS) while performing data communication in the cellular system. During simultaneous communication in the cellular system and the other radio system (for example, a GNSS or a wireless LAN), an IMD or a harmonic distortion caused by uplink transmission in the cellular system may affect signal reception in a reception frequency band in the other radio system (a frequency band in which the mobile terminal can receive signals in the other radio system).

FIG. 1 shows an example of an effect of an IMD caused by uplink transmission in a cellular system on another radio system. In FIG. 1, a Long Term Evolution (LTE) system is used as an example of the cellular system. When a mobile terminal uses two or more component carriers (for example, CC#1 and CC#2) in the LTE system, a plurality of transmission waves are input into a switch (SW), and then IMDs occur at positions defined by the combination of the sums or the differences of the frequencies of these transmission waves. In addition, when two or more component carriers (for example, CC#1 and CC#2) are used, or when a single component carrier (for example, one of CC#1 and CC#2) is used, harmonic distortions occur at positions defined by multiples of the frequency of the transmission wave. When an IMD or a harmonic distortion falls within a reception frequency band of the other radio system, a reception sensitivity of the other radio system in the mobile terminal is degraded.

In order to avoid degradation in the reception sensitivity of the other radio system, it is possible to decrease transmission power in the cellular system.

FIG. 2 shows an example to reduce an effect of an IMD on the other radio system by decreasing transmission power. It is understood from FIG. 2 that by decreasing transmission power of the mobile terminal in two frequency bands of the cellular system, the IMD can be also reduced. As a result, the effect of the IMD on the other radio system can be also reduced. Alternatively, when the IMD is the cause of degradation in the sensitivity, it is possible to cancel the use of a plurality of frequency bands.

FIG. 3 shows an example to reduce an effect of a harmonic distortion on the other radio system by decreasing transmission power. It is understood from FIG. 3 that by decreasing transmission power of the mobile terminal in the cellular system, the harmonic distortion can be also reduced. As a result, the effect of the harmonic distortion on the other radio system can be also reduced.

However, these solutions may degrade communication quality (for example, a transmission speed or coverage), and thus another solution is desired.

It is an object of the present invention to identify by a base station that simultaneous communication performed by a mobile terminal in a cellular system and another radio system may cause degradation in a reception sensitivity of the other radio system. Alternatively, it is an object of the present invention to maintain communication quality in a cellular system while reducing degradation in a reception sensitivity of another radio system, when a mobile terminal simultaneously communicates in the cellular system and the other radio system.

Means For Solving the Problem(s)

In one aspect of the present invention, there is provided a mobile terminal capable of communication in a cellular system and another radio system with a different frequency band, including:

a simultaneous communication determination unit configured to determine whether the mobile terminal simultaneously communicates in the cellular system and the other radio system; and a notification unit configured to notify a base station that the mobile terminal is in a simultaneous communication state, when the mobile terminal simultaneously communicates in the cellular system and the other radio system.

In another aspect of the present invention, there is provided a base station for communicating with a mobile terminal capable of communication in a cellular system and another radio system with a different frequency band, including:

a reception unit configured to receive from the mobile terminal information indicating that the mobile terminal simultaneously communicates in the cellular system and the other radio system; and a scheduling unit configured to perform scheduling so as to prevent an inter-modulation distortion or a harmonic distortion, which is caused by uplink transmission from the mobile terminal in the cellular system, from overlapping a frequency band of the other radio system, when the information indicating that the mobile terminal simultaneously communicates in the cellular system and the other radio system is received.

In another aspect of the present invention, there is provided a communication state notification method in a mobile terminal capable of communication in a cellular system and another radio system with a different frequency band, including the steps of:

determining whether the mobile terminal simultaneously communicates in the cellular system and the other radio system; and notifying a base station that the mobile terminal is in a simultaneous communication state, when the mobile terminal simultaneously communicates in the cellular system and the other radio system.

In another aspect of the present invention, there is provided a scheduling method in a base station for communicating with a mobile terminal capable of communication in a cellular system and another radio system with a different frequency band, including the steps of:

receiving from the mobile terminal information indicating that the mobile terminal simultaneously communicates in the cellular system and the other radio system; and performing scheduling so as to prevent an inter-modulation distortion or a harmonic distortion, which is caused by uplink transmission from the mobile terminal in the cellular system, from overlapping a frequency band of the other radio system, when the information indicating that the mobile terminal simultaneously communicates in the cellular system and the other radio system is received.

Advantageous Effect of the Invention

According to the present invention, a base station can identify that simultaneous communication performed by a mobile terminal in a cellular system and another radio system may cause degradation in a reception sensitivity of the other radio system. Alternatively, when a mobile terminal simultaneously communicates in a cellular system and another radio system, it is possible to maintain communication quality in the cellular system while reducing degradation in a reception sensitivity of the other radio system.

BRIEF DESCRIPTION OF THE DRAWINGS

FIG. 8 shows frequency ranges where IMDs or harmonic distortions occur.

DETAILED DESCRIPTION OF THE PREFERRED EMBODIMENTS

Embodiments of the present invention are described below with reference to the drawings.

An embodiment of the present invention discloses a mobile terminal capable of communication in a plurality of radio systems. One of the plurality of radio systems is a system such as a cellular system in which a base station can perform scheduling in a frequency domain. Another radio system is a system with a different frequency band such as a GNSS or a wireless LAN.

The mobile terminal determines whether the mobile terminal simultaneously communicates in the cellular system and the other radio system and notifies the base station that the mobile terminal is in a simultaneous communication state in the case of simultaneous communication. When the base station receives from the mobile terminal information indicating that the mobile terminal is in the simultaneous communication state in the cellular system and the other radio system, the base station can perform scheduling so as to prevent an inter-modulation distortion or a harmonic distortion, which is caused by uplink transmission from the mobile terminal, from overlapping a frequency band of the other radio system.

Figure 1:
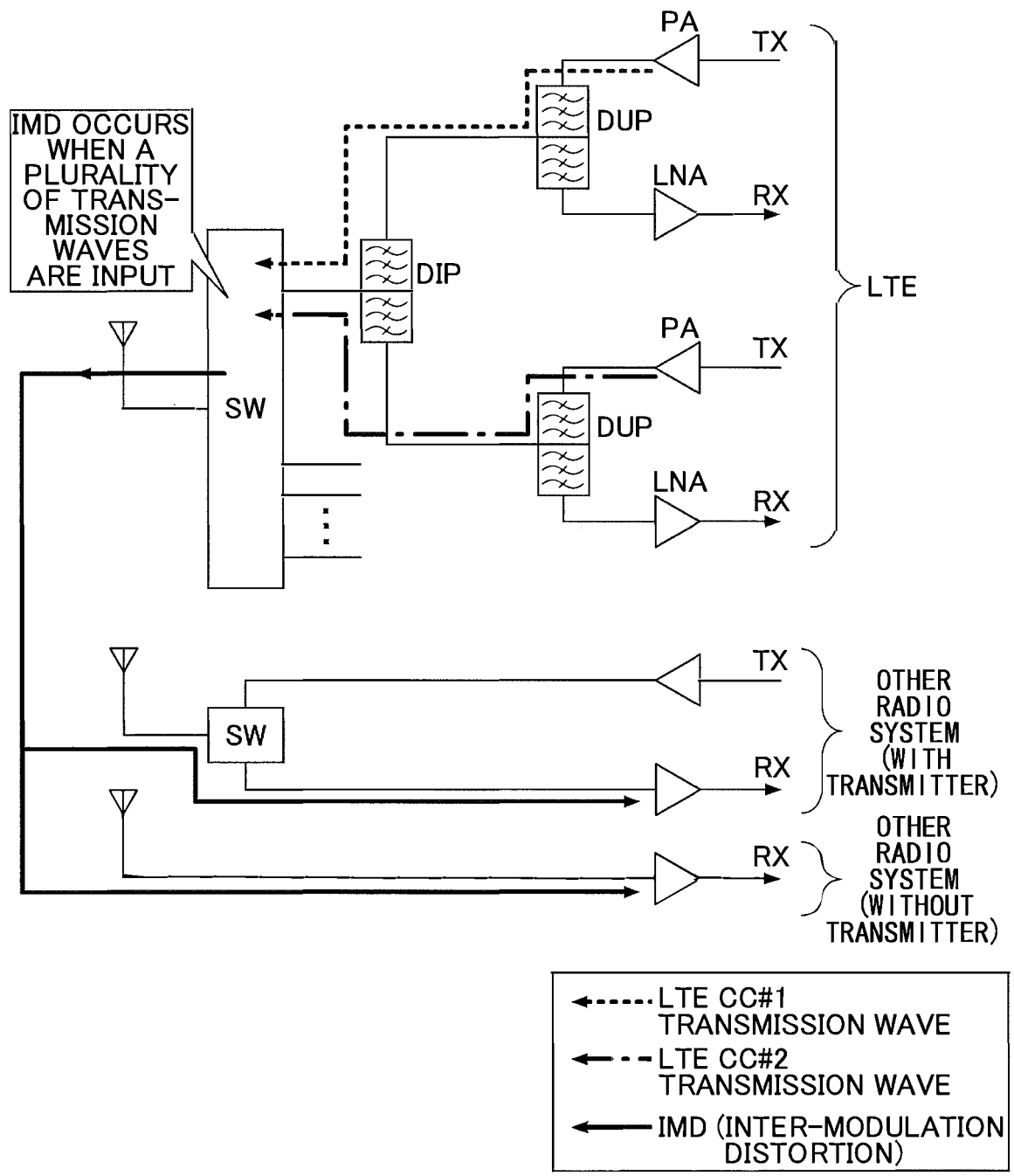
FIG. 1 shows an example of an effect of an IMD caused by uplink transmission in a cellular system on another radio system.
Figure 2:
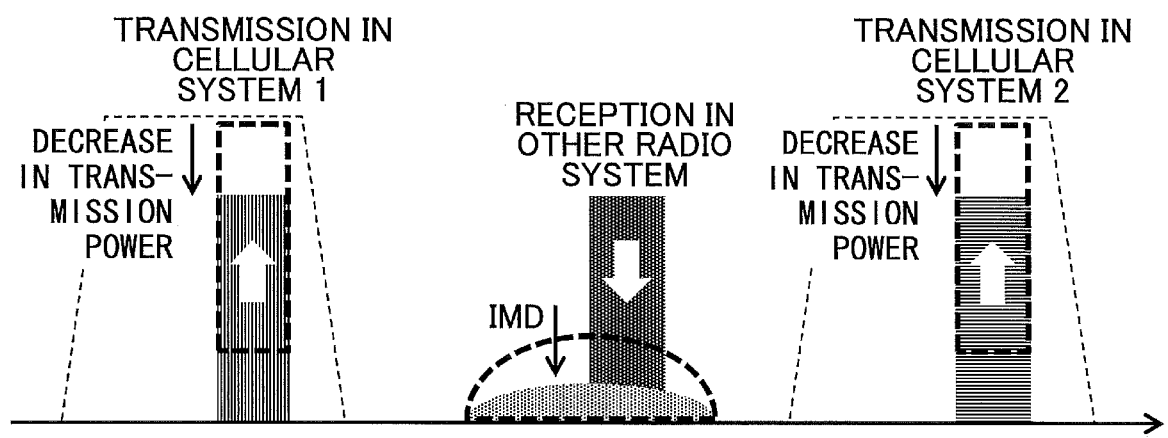
FIG. 2 shows an example to reduce an effect of an IMD on the other radio system by decreasing transmission power.
Figure 3:
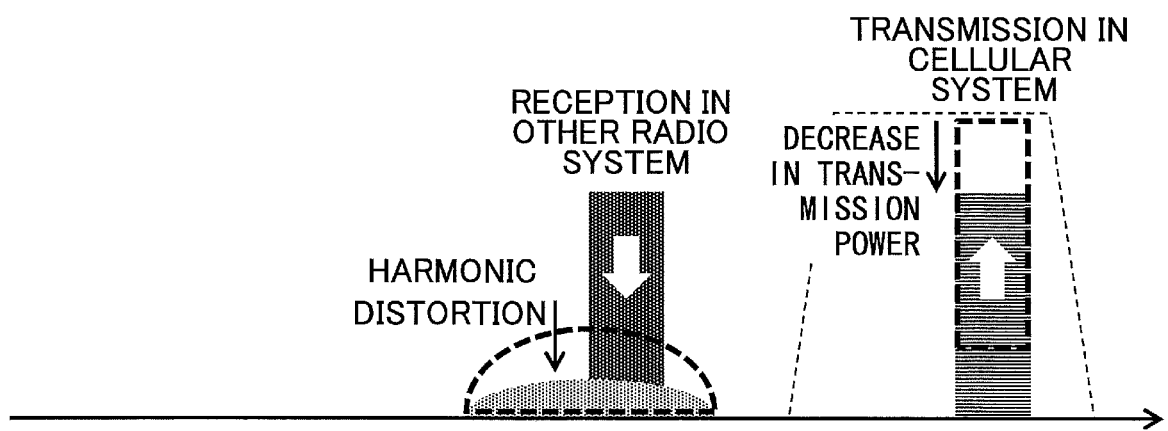
FIG. 3 shows an example to reduce an effect of a harmonic distortion on the other radio system by decreasing transmission power.
Figure 4:
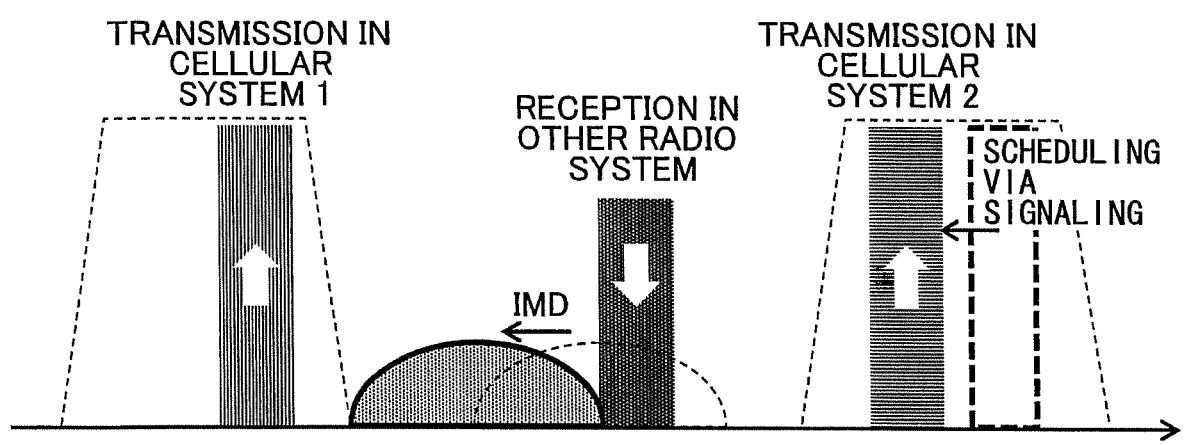
FIG. 4 shows an approach to reduce an effect of an IMD on the other radio system according to an embodiment of the present invention.

FIG. 4 shows an approach to reduce an effect of an IMD on the other radio system according to an embodiment of the present invention. For example, when two frequency bands are simultaneously used according to carrier aggregation, an IMD may occur as a result of the combination of signals on these frequency bands. As a result, the IMD may affect a reception sensitivity of the other radio system.

When the mobile terminal determines that the mobile terminal is in the simultaneous communication state in the cellular system and the other radio system, the mobile terminal notifies the base station that the mobile terminal is in the simultaneous communication state. When the base station receives the notification from the mobile terminal, the base station can determine whether the IMD caused by transmission waves in the two frequency bands overlaps a reception frequency band of the other radio system. When the IMD overlaps the reception frequency band of the other radio system, the base station can shift the position of the IMD by means of scheduling. In other words, the base station performs scheduling so as to prevent the IMD from overlapping the frequency band of the other radio system. Consequently, it is possible to maintain communication quality in the cellular system while reducing or avoiding degradation in a reception sensitivity of the other radio system.

Figure 5:
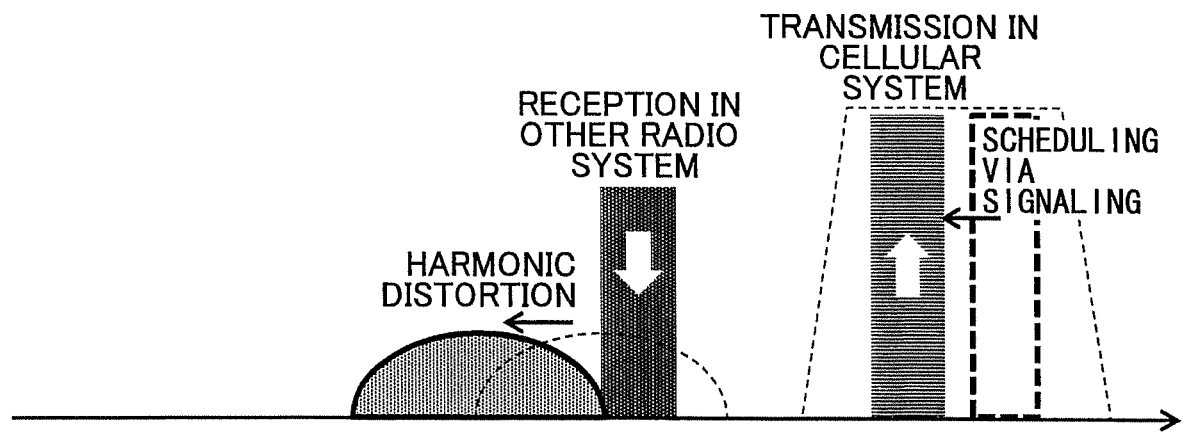
FIG. 5 shows an approach to reduce an effect of a harmonic distortion on the other radio system according to an embodiment of the present invention.

FIG. 5 shows an approach to reduce an effect of a harmonic distortion on the other radio system according to an embodiment of the present invention. Not only when a plurality of frequency bands are simultaneously used according to carrier aggregation, but also when a single frequency band is used, a harmonic distortion may occur. As a result, the harmonic distortion may affect a reception sensitivity of the other radio system.

When the mobile terminal determines that the mobile terminal is in the simultaneous communication state in the cellular system and the other radio system, the mobile terminal notifies the base station that the mobile terminal is in the simultaneous communication state. When the base station receives the notification from the mobile terminal, the base station can determine whether the harmonic distortion caused by transmission waves in the cellular system overlaps a reception frequency band of the other radio system. When the harmonic distortion overlaps the reception frequency band of the other radio system, the base station can shift the position of the harmonic distortion by means of scheduling. In other words, the base station performs scheduling so as to prevent the harmonic distortion from overlapping the frequency band of the other radio system. Consequently, it is possible to maintain communication quality in the cellular system while reducing or avoiding degradation in a reception sensitivity of the other radio system.

A specific configuration and operation are described below to reduce or avoid an effect on the other radio system by means of scheduling in the cellular system.

<Configuration of a Mobile Terminal>

Figure 6:
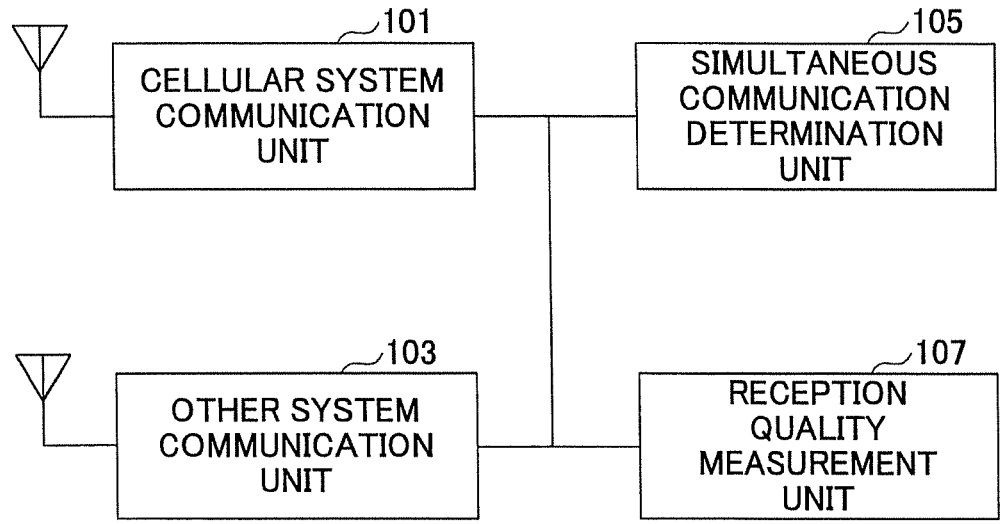
FIG. 6 shows a functional block diagram illustrating a configuration of a mobile terminal according to an embodiment of the present invention.

FIG. 6 shows a functional block diagram illustrating a configuration of a mobile terminal according to an embodiment of the present invention. The mobile terminal 10 according to the embodiment of the present invention is an apparatus capable of communication in the cellular system and another radio system. The cellular system is a radio system in which base stations are deployed to cover areas referred to as cells for communication. The cellular system includes Universal Mobile Telecommunications System (UMTS), UMTS enhancement, LTE single-cluster, LTE multi-cluster, UL inter-band CA, UL intra-band contiguous CA, intra-band non-contiguous CA, Dual Connectivity, or the like, or the combination of them. In the cellular system, a frequency band (for example, 700 MHz band) which is continuous in the frequency domain may be used, or frequency bands (for example, the combination of 700 MHz band and 2 GHz band) which is discontinuous in the frequency domain may be used. The other radio system is a system with a frequency band different from the frequency band of the cellular system. The other radio system includes a GNSS, a wireless LAN, or the like.

The mobile terminal 10 includes a cellular system communication unit 101, an other radio system communication unit 103, a simultaneous communication determination unit 105, and a reception quality measurement unit 107.

The cellular system communication unit 101 receives downlink signals from a base station of the cellular system in one or more predetermined frequency bands and transmits uplink signals to the base station of the cellular system. As described below, the cellular system communication unit 101 transmits to the base station information indicating that the mobile terminal 10 is in a simultaneous communication state in the cellular system and the other radio system.

The other radio system communication unit 103 receives signals in a predetermined frequency band different from the frequency bands used by the cellular system communication unit 101. The other radio system communication unit 103 may only receive signals in the case of a GNSS or the like, for example, or may also transmit signals in the case of a wireless LAN or the like, for example.

The simultaneous communication determination unit 105 determines whether the mobile terminal 10 simultaneously communicates in the cellular system and the other radio system. Specifically, the simultaneous communication determination unit 105 determines whether the other radio system communication unit 103 receives a signal while the cellular system communication unit 101 performs uplink transmission. When the mobile terminal 10 simultaneously communicates in the cellular system and the other radio system, the simultaneous communication determination unit 105 notifies the base station via the cellular system communication unit 101 that the mobile terminal 10 is in the simultaneous communication state. When two or more other radio systems are involved, the information indicating that the mobile terminal 10 is in the simultaneous communication state may include a type of the radio system in the simultaneous communication state.

The reception quality measurement unit 107 measures reception quality of the signal received by the other system communication unit 103. Specifically, the reception quality measurement unit 107 measures degradation in reception quality due to an IMD or a harmonic distortion. For example, when reception quality of the signal received by the other system communication unit 103 is less than a predetermined threshold and the frequency of the received signal overlaps one of frequency ranges where the IMD or the harmonic distortion occurs, the reception quality measurement unit 107 can determine that the reception quality is degraded due to the IMD or the harmonic distortion. In order to reduce the amount of signaling for notifying the base station that the mobile terminal is in the simultaneous communication state, the notification that the mobile terminal is in the simultaneous communication state may be provided when the reception quality is degraded due to the IMD or the harmonic distortion.

<Configuration of a Base Station>

Figure 7:
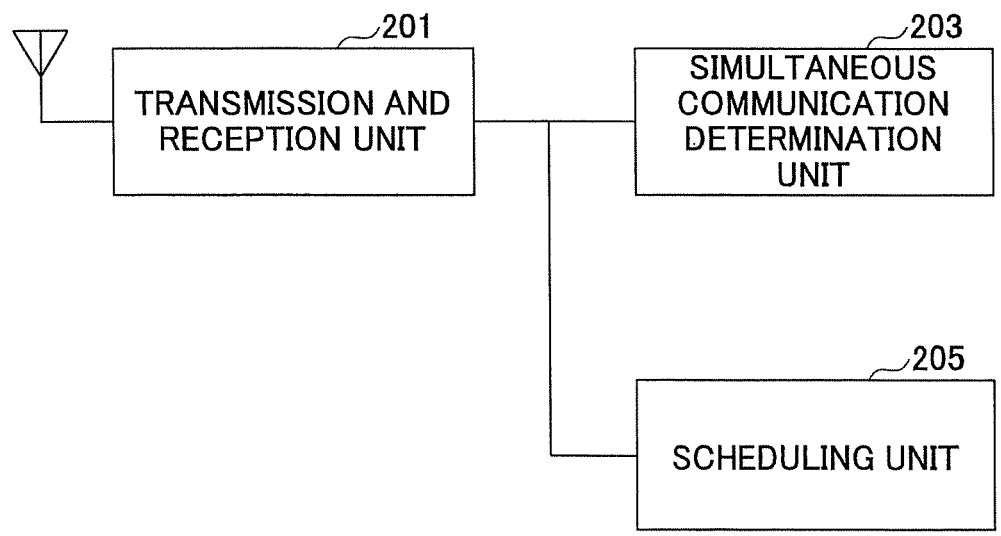
FIG. 7 shows a functional block diagram illustrating a configuration of a base station according to an embodiment of the present invention.

FIG. 7 shows a functional block diagram illustrating a configuration of a base station according to an embodiment of the present invention. The base station 20 according to the embodiment of the present invention is an apparatus for communicating with the mobile terminal 10 as described above with reference to FIG. 6 and is capable of performing scheduling in a frequency domain.

The base station 20 includes a transmission and reception unit 201, a simultaneous communication determination unit 203, and a scheduling unit 205.

The transmission and reception unit 201 receives uplink signals from a mobile terminal in one or more predetermined frequency bands and transmits downlink signals to the mobile terminal. The transmission and reception unit 201 receives from the mobile terminal 10 information indicating that the mobile terminal 10 is in a simultaneous communication state in the cellular system and the other radio system.

The simultaneous communication determination unit 203 determines that the mobile terminal 10 simultaneously communicates in the cellular system and the other radio system based on the information indicating that the mobile terminal 10 is in the simultaneous communication state in the cellular system and the other radio system, which is received by the transmitting and receiving unit 201 from the mobile terminal 10. When the mobile terminal 10 is in the simultaneous communication state in the cellular system and the other radio system, the simultaneous communication determination unit 203 can further determine whether an IMD or a harmonic distortion falls within a reception frequency band of the other radio system, because the simultaneous communication determination unit 203 can identify frequency ranges where the IMD or the harmonic distortion caused by uplink transmission in the cellular system occurs. It is assumed that the reception frequency band of the other radio system is defined in advance and stored in a memory or the like (not shown) in the base station 20. The frequency ranges where the IMD or the harmonic distortion occurs are described in detail below. When the information indicating that the mobile terminal 10 is in the simultaneous communication state includes a type of the radio system in the simultaneous communication state, the simultaneous communication determination unit 203 can identify the reception frequency band of the radio system.

The scheduling unit 205 performs scheduling to allocate radio resources to the mobile terminal 10. Specifically, the scheduling unit 205 allocates to the mobile terminal 10 a frequency and a time for uplink transmission. The frequency and the time allocated to the mobile terminal 10 are provided to the mobile terminal 10 via the transmission and reception unit 201.

The scheduling unit 205 performs scheduling so as to prevent the IMD or the harmonic distortion, which is caused by uplink transmission from the mobile terminal 10, from overlapping the frequency band of the other radio system, when the transmission and reception unit 201 receives the information indicating that the mobile terminal 10 is in the simultaneous communication state in the cellular system and the other radio system, that is, when the simultaneous communication determination unit 203 determines that the mobile terminal 10 simultaneously communicates in the cellular system and the other radio system. The frequency ranges where the IMD or the harmonic distortion occurs are described in detail below.

For the purpose of scheduling, the scheduling unit 205 may calculate the frequency ranges where the IMD or the harmonic distortion occurs based on the frequency used for uplink transmission. Alternatively, for the purpose of scheduling, the scheduling unit 205 may refer to a table listing the frequency ranges where the IMD or the harmonic distortion occurs.

FIG. 8 shows frequency ranges where IMDs or harmonic distortions occur. For example, when two discontinuous frequency bands are allocated to uplink transmission from a mobile terminal, one of the frequency bands lies between fx_low and fx_high, and the other of the frequency bands lies between fy_low and fy_high, ranges where harmonic distortions may occur lie between $i*fx\_low$ and $i*fx\_high$ and between $i*fy\_low$ and $i*fy\_high$ ($i=2, 3, \ldots$). For example, as shown in FIG. 8, the range between $2*fx\_low$ and $2*fx\_high$ and the range between $2*fy\_low$ and $2*fy\_high$ (2nd order harmonic), the range between $3*fx\_low$ and $3*fx\_high$ and the range between $3*fy\_low$ and $3*fy\_high$ (3rd order harmonic), and so on can be calculated.

Ranges where IMDs may occur lie between $|j*fx\_low-k*fy\_high|$ and $|l*fx\_high-m*fy\_low|$ and between $|j*fy\_low-k*fx\_high|$ and $|l*fy\_high-m*fx\_low|$ ($j=1, 2, \ldots; k=1, 2, \ldots; l=1, 2, \ldots; m=1, 2, \ldots$). For example, as shown in FIG. 8, the range between $|fx\_low-fy\_high|$ and $|fx\_high-fy\_low|$ (Two-tone 2nd order IMD), the range between $|2*fx\_low-1*fy\_high|$ and $|2*fx\_high-1*fy\_low|$ and the range between $|2*fx\_low-1*fy\_high|$ and $|2*fx\_high-1*fy\_low|$ (Two-tone 3rd order IMD), and so on can be calculated.

The frequency ranges where the IMD or the harmonic distortion occurs may be calculated when the information indicating that the mobile terminal 10 is in the simultaneous communication state or may be calculated in advance and stored in the table. The scheduling unit 205 compares the frequency ranges where the IMD or the harmonic distortion occurs with the reception frequency band of the other radio system and shifts the frequency allocated to the mobile terminal 10 when the frequency ranges overlap the reception frequency band.

On the other hand, when information indicating that the mobile terminal 10 is in the simultaneous communication state is not received, the scheduling unit 205 need not consider an effect of the IMD or the harmonic distortion. In this case, the scheduling unit 205 performs scheduling as usual based on quality of service (QoS), a packet type, a propagation condition, or the like.

<Operation of a Mobile Terminal and a Base Station>

Figure 9:
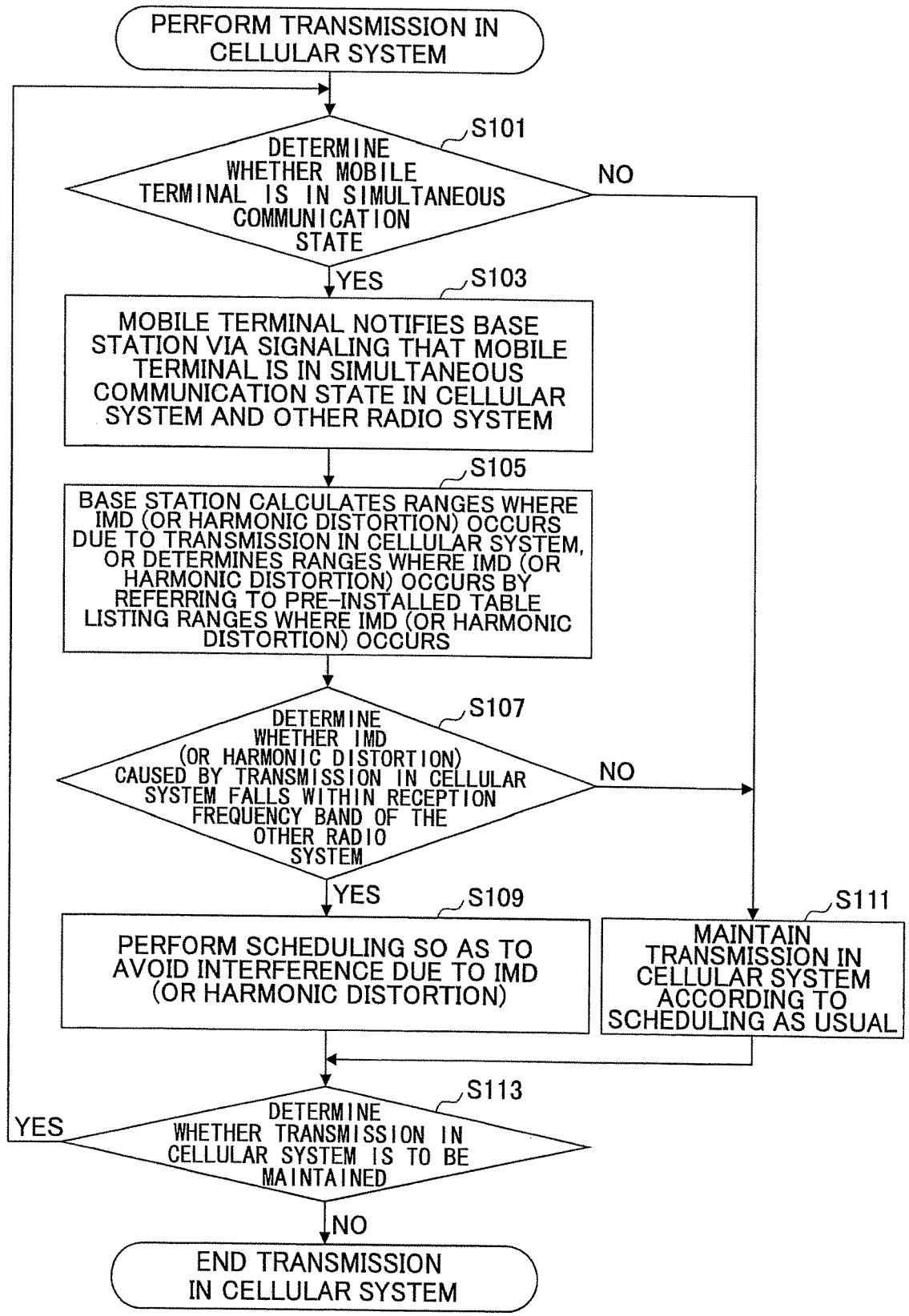
FIG. 9 shows a flowchart of an operation in a mobile terminal and a base station according to an embodiment of the present invention.

FIG. 9 shows a flowchart of an operation in a mobile terminal 10 and a base station 20 according to an embodiment of the present invention.

First, in step S101, while the mobile terminal 10 performs uplink transmission to the base station 20 in a cellular system, the mobile terminal 10 determines whether the mobile terminal 10 is in the simultaneous communication state in another radio system. When the mobile terminal 10 is not in the simultaneous communication state, the mobile terminal 10 need not notify the base station 20 that the mobile terminal 10 is in the simultaneous communication state in the cellular system and the other radio system. Thus, in step S111, the base station 20 performs scheduling as usual. In step S113, when the mobile terminal 10 continues transmission in the cellular system, that is, when there is data to be transmitted or received, the process returns to step S101 to repeat the process. When the mobile terminal 10 does not continue transmission in the cellular system, the process comes to an end.

On the other hand, when the mobile terminal 10 is in the simultaneous communication state, the mobile terminal 10 notifies the base station 20 via signaling that the mobile terminal 10 is in the simultaneous communication state in the cellular system and the other radio system.

In step S105, when the base station 20 receives the notification from the mobile terminal 10 that the mobile terminal 10 is in the simultaneous communication state in the cellular system and the other radio system, the base station 20 calculates ranges where an IMD or a harmonic distortion occurs due to transmission in the cellular system, or refers to a table listing pre-calculated ranges where an IMD or a harmonic distortion occurs. In step S107, the base station 20 determines whether the IMD or the harmonic distortion caused by uplink transmission in the cellular system falls within the reception frequency band of the other radio system. When the IMD or the harmonic distortion caused by uplink transmission in the cellular system does not fall within the reception frequency band of the other radio system, in step S111, the base station 20 performs scheduling as usual. In step S113, when the mobile terminal 10 continues transmission in the cellular system, the process returns to step S101 to repeat the process. When the mobile terminal 10 does not continue uplink transmission in the cellular system, the process comes to an end.

On the other hand, when the IMD or the harmonic distortion caused by uplink transmission in the cellular system falls within the reception frequency band of the other radio system, in step S109, the base station 20 performs scheduling so as to prevent the IMD or the harmonic distortion caused by uplink transmission in the cellular system from overlapping the frequency band of the other radio system. In step S113, when the mobile terminal 10 continues transmission in the cellular system, the process returns to step S101 to repeat the process. When the mobile terminal 10 does not continue transmission in the cellular system, the process comes to an end.

<Effects of Embodiments of the Present Invention>

According to an embodiment of the present invention, when a mobile terminal simultaneously communicates in a cellular system and another radio system, a base station can identify that a reception sensitivity of the other radio system is degraded due to the simultaneous communication. In addition, when the mobile terminal simultaneously communicates in the cellular system and the other radio system, the degradation in the reception sensitivity of the other radio system can be reduced while communication quality in the cellular system is maintained.

Furthermore, the amount of signaling can be reduced by notifying the base station that the mobile terminal is in the simultaneous communication state only when reception quality is degraded due to an IMD or a harmonic distortion. The base station may calculate ranges where the IMD or the harmonic distortion occurs when information indicating that the mobile terminal is in the simultaneous communication state or may determine the ranges by referring to a pre-calculated table listing the ranges where the IMD or the harmonic distortion occurs. By referring to the table, the workload of the base station can be reduced.

For convenience of explanation, the mobile terminal and the base station according to the embodiments of the present invention have been described with reference to functional block diagrams, but the mobile terminal and the base station may be implemented in hardware, software, or combinations thereof. In addition, two or more functional elements may be combined as appropriate. The method according to the embodiments of the present invention may be carried out in a different order from the order shown in the embodiments.

While the approaches are described above to identify by a base station that simultaneous communication performed by a mobile terminal in a cellular system and another radio system may cause degradation in a reception sensitivity of the other radio system as well as to maintain communication quality in a cellular system while reducing degradation in a reception sensitivity of another radio system, when a mobile terminal simultaneously communicates in the cellular system and the other radio system, the present invention is not limited to the embodiments, but various modifications and applications can be made by those skilled in the art within the scope of the claims.

The present international application is based on and claims the benefit of priority of Japanese Patent Application No. 2014-197416 filed on Sep. 26, 2014, the entire contents of which are hereby incorporated by reference.

DESCRIPTION OF NOTATIONS 10 mobile terminal
101 cellular system communication unit
103 other system communication unit
105 simultaneous communication determination unit
107 reception quality measurement unit
20 base station
201 transmission and reception unit
203 simultaneous communication determination unit
205 scheduling unit

The invention claimed is:

1. A mobile terminal capable of communication in a cellular system and another radio system with a different frequency band, comprising:
  a processor configured to determine whether the mobile terminal simultaneously communicates in the cellular system and the other radio system and measure degradation in reception quality due to an inter-modulation distortion or a harmonic distortion; and
  the processor in conjunction with a transmitter configured to notify a base station that the mobile terminal is in a simultaneous communication state, when the mobile terminal simultaneously communicates in the cellular system and the other radio system and when the reception quality is degraded due to the inter-modulation distortion or the harmonic distortion,
  wherein the processor in conjunction with the transmitter is configured to notify the base station regarding a type of the radio system in the simultaneous communication state by indicating that the other radio system is a type of GNSS, WLAN, or Bluetooth system.

2. A base station for communicating with a mobile terminal capable of communication in a cellular system and another radio system with a different frequency band, comprising:
  a receiver configured to receive from the mobile terminal information indicating that the mobile terminal simultaneously communicates in the cellular system and the other radio system; and
  a processor configured to prevent an inter-modulation distortion or a harmonic distortion, which is caused by uplink transmission from the mobile terminal in the cellular system, from overlapping a frequency band of the other radio system, when the information indicating that the mobile terminal simultaneously communicates in the cellular system and the other radio system is received,
  wherein the information is provided when the mobile terminal simultaneously communicates in the cellular system and the other radio system and when reception quality is degraded due to the inter-modulation distortion or the harmonic distortion,
  wherein the receiver of the base station receives information regarding a type of the radio system in the simultaneous communication state, and
  wherein the information indicates that the other radio system is a type of GNSS, WLAN, or Bluetooth system.

3. The base station as claimed in claim 2, wherein the processor calculates frequency ranges where the inter-modulation distortion or the harmonic distortion caused by uplink transmission from the mobile terminal in the cellular system occurs, and performs scheduling to prevent the calculated frequency ranges where the inter-modulation distortion or the harmonic distortion occurs from overlapping the frequency band of the other radio system.

4. The base station as claimed in claim 2, wherein the processor refers to a table listing frequency ranges where the inter-modulation distortion or the harmonic distortion caused by uplink transmission from the mobile terminal in the cellular system occurs to perform scheduling so as to prevent the frequency ranges where the inter-modulation distortion or the harmonic distortion occurs from overlapping the frequency band of the other radio system.

5. A communication state notification method in a mobile terminal capable of communication in a cellular system and another radio system with a different frequency band, comprising:

determining whether the mobile terminal simultaneously communicates in the cellular system and the other radio system and measuring degradation in reception quality due to an inter-modulation distortion or a harmonic distortion; and notifying a base station that the mobile terminal is in a simultaneous communication state, when the mobile terminal simultaneously communicates in the cellular system and the other radio system and when the reception quality is degraded due to the inter-modulation distortion or the harmonic distortion, wherein the mobile terminal notifies the base station regarding a type of the radio system in the simultaneous communication state by indicating that the other radio system is a type of GNSS, WLAN, or Bluetooth system.

6. A processing method in a base station for communicating with a mobile terminal capable of communication in a cellular system and another radio system with a different frequency band, comprising:

receiving from the mobile terminal information indicating that the mobile terminal simultaneously communicates in the cellular system and the other radio system; and preventing an inter-modulation distortion or a harmonic distortion, which is caused by uplink transmission from the mobile terminal in the cellular system, from overlapping a frequency band of the other radio system, when the information indicating that the mobile terminal simultaneously communicates in the cellular system and the other radio system is received, wherein the information is provided when the mobile terminal simultaneously communicates in the cellular system and the other radio system and when reception quality is degraded due to the inter-modulation distortion or the harmonic distortion, wherein the base station receives information regarding a type of the radio system in the simultaneous communication state, and wherein the information indicates that the other radio system is a type of GNSS, WLAN, or Bluetooth system.

\* \* \* \* \*